United States Patent [19]
Komori et al.

[11] 3,743,406
[45] July 3, 1973

[54] ELECTROPHOTOGRAPHIC COPYING APPARATUS

[75] Inventors: Shigehiro Komori, Yokohama; Jiro Sato, Kawasaki; Kazumi Umezawa, Yokohama, all of Japan

[73] Assignee: Canon Kabushiki Kaisha, Tokyo, Japan

[22] Filed: Nov. 5, 1970

[21] Appl. No.: 87,098

[30] Foreign Application Priority Data
Nov. 11, 1969 Japan............................ 44/90247
Nov. 11, 1969 Japan............................ 44/90248
Mar. 6, 1970 Japan............................ 45/19496
Sept. 7, 1970 Japan............................ 45/77832

[52] U.S. Cl................. 355/8, 355/11, 355/14, 355/50, 355/51
[51] Int. Cl............................................. G03g 15/00
[58] Field of Search ............ 355/3, 8, 11, 14, 355/50, 51

[56] References Cited
UNITED STATES PATENTS
3,604,796  9/1971  Ogawa ........................ 355/14
3,592,540  7/1971  Cranskens ..................... 355/14
3,586,436  6/1971  Jarzembski et al. ............. 355/10
3,445,160  5/1969  Helland ....................... 355/14 X
3,545,856  12/1970  Limberger .................... 355/51

Primary Examiner—Samuel S. Matthews
Assistant Examiner—Russell E. Adams, Jr.
Attorney—Ward, McElhannon, Brooks & Fitzpatrick

[57] ABSTRACT

A compact and light-weight electrophotographic copying apparatus which includes an original feeding table and a photosensitive paper supply table both disposed within a machine housing in the upper portion thereof, means for transporting an original toward an original illuminating station, means for feeding sheets of photosensitive paper from said paper supply table in synchronism with the movement of the original and transporting the sheets to an exposure station optically connected to said illuminating station through an optical system, whereby the original is electrophotographically copied on the sheets of photosensitive paper in succession without any trouble or malfunctioning during operation.

2 Claims, 16 Drawing Figures

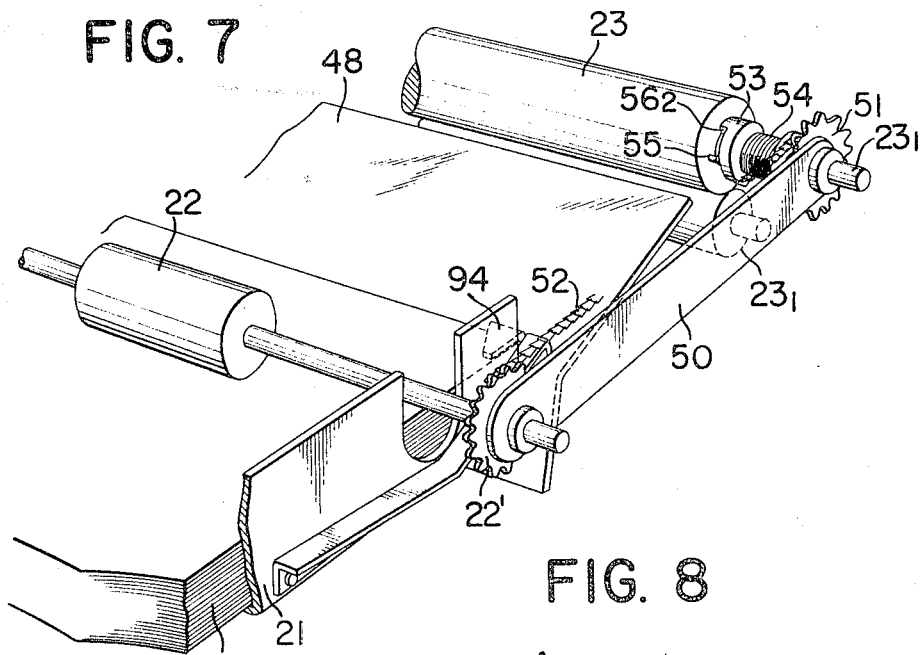
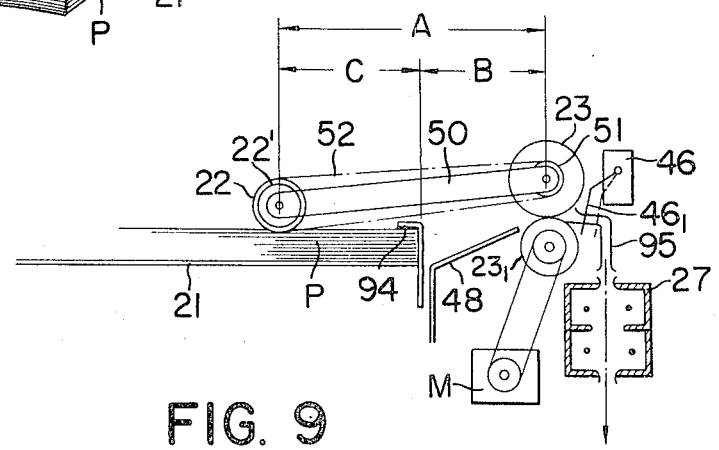
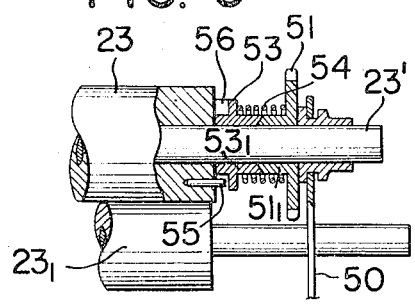

FIG. 16
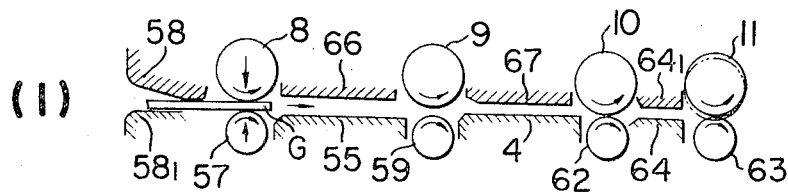
(1)
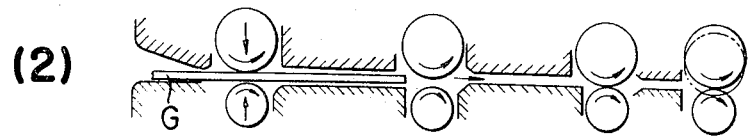
(2)
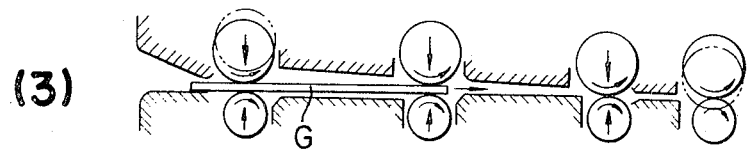
(3)
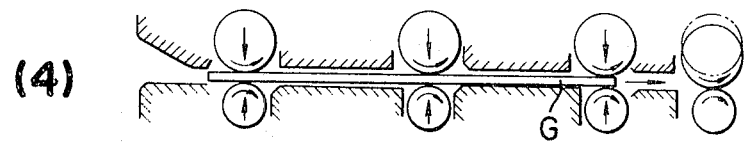
(4)
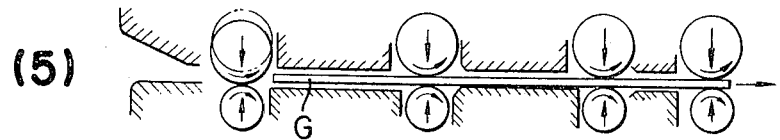
(5)
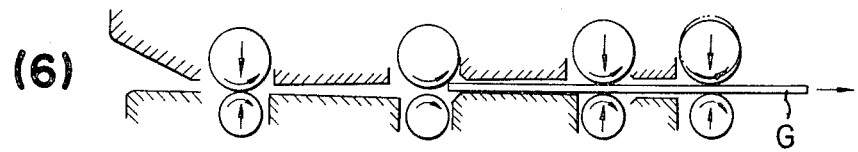
(6)

ELECTROPHOTOGRAPHIC COPYING APPARATUS

BACKGROUND OF THE INVENTION

Field of the Invention

This invention relates to an electrophotographic copying apparatus of the type in which copying paper sheets fed one by one are subjected to through-slit exposure process while an original to be copied is being transported, and more particularly to improvements in means for feeding copying paper sheets and means for transporting the original which are incorporated in such a copying apparatus.

Description of the Prior Art

In any known electrophotographic copying apparatus of the described type, it has often been the practice that an original to be copied is transported along a curvilinear path and that the original must be only in the form of thin sheet and any thicker original cannot be copied. If the original to be copied has a substantial thickness, such original may strike the original transport means and thereby be deformed or jammed in the course of transport. Another disadvantage of the known apparatus is that the location of a copying paper supply table in a relatively lower portion of the machine housing has led to difficulties in supplying the copying paper sheets. Furthermore, even in a copying apparatus equipped with means for preventing sheets of photosensitive paper from being supplied in overlapping relationship, such means may fail to ensure reliable performance and sheets of photosensitive paper may be fed in overlapping relationship to cause jamming or other trouble during the course of feed.

SUMMARY OF THE INVENTION

It is an object of the present invention to provide an improved electrophotographic copying apparatus which can overcome the above-described disadvantages and which has high practical values such as compact and lightweight construction and great convenience in operation, especially in feeding photosensitive sheets.

It is another object of the present invention to provide an electrophotographic copying apparatus in which a horizontal path of transport is provided for an original to be copied so as to enable any thick original to be readily copied.

It is still another object of the present invention to provide means for preventing an original from striking original transport means with too great an impact which may cause deformation or deviation of the original being transported, and ensuring the original to be transported at a predetermined velocity while synchronizing the feed of photosensitive sheets with the transportation of the original.

According to a feature of the present invention, an original feeding table and a photosensitive sheet supply table are disposed within a machine housing in the upper portion thereof. An original resting on the original feeding table is horizontally fed toward an original illuminating station, and in synchronism therewith a photosensitive sheet is horizontally fed from the photosensitive sheet supply table in the opposite direction to the direction of movement of the original. The photosensitive sheet thus fed is passed through electrically charging means and through-slit exposure means both disposed vertically along one end wall of the machine housing, so as to form an electrostatic latent image of the original on the photosensitive sheet.

According to a further feature of the present invention, the original feeding table is mounted on the machine housing for pivotal movement with respect thereto, and original transport means including an original illuminating station is disposed in front of the original feeding table and supported openably or detachably with respect to the machine housing.

According to a further feature of the present invention, the distance over which the original placed in the housing travels to reach the original illuminating station differs from the distance over which the photosensitive sheet fed from the supply table travels to reach the exposure means, while the original and the photosensitive sheet are sychronized together in movement during the initial stage of a copying operation, thus minimizing the space occupied and making the entire apparatus compact in structure.

According to still a further feature of the present invention, photosensitive sheets are fed intermittently one by one and these fed photosensitive sheets are initially in a certain degree of overlapping relationship with one another, whereafter such overlapping sheets are spaced apart axially thereof by providing a difference between the rotational velocities of paper feed roller and paper transport rollers both controlled by a paper feed drive motor. The leading edge of each photosensitive sheet thus separated actuates a microswitch disposed in the path of photosensitive paper, thereby stopping the paper feed drive motor. Thus, it is prevented by a simple mechanism that all the photosensitive sheets on the supply table are fed continuously in response to a single copy-start signal until the paper stock exhausts on the supply table.

The above and other objects and features of the present invention will become more apparent from the following detailed description of various embodiments of the invention when read in conjunction with the accompanying drawings.

BRIEF DESCRIPTION OF THE DRAWINGS

FIG. 7 shows in perspective view an example of the paper feeding means according to the present invention.

FIG. 8 is a front view of the paper feeding means shown in FIG. 7.

FIG. 9 is a longitudinal cross-sectional view of one end portion of the paper feed rollers.

FIG. 16 illustrates the manner in which the transport rollers and guide plates are operated in the original transport means of FIG. 12.

DESCRIPTION OF THE PREFERRED EMBODIMENTS

Figure 1:
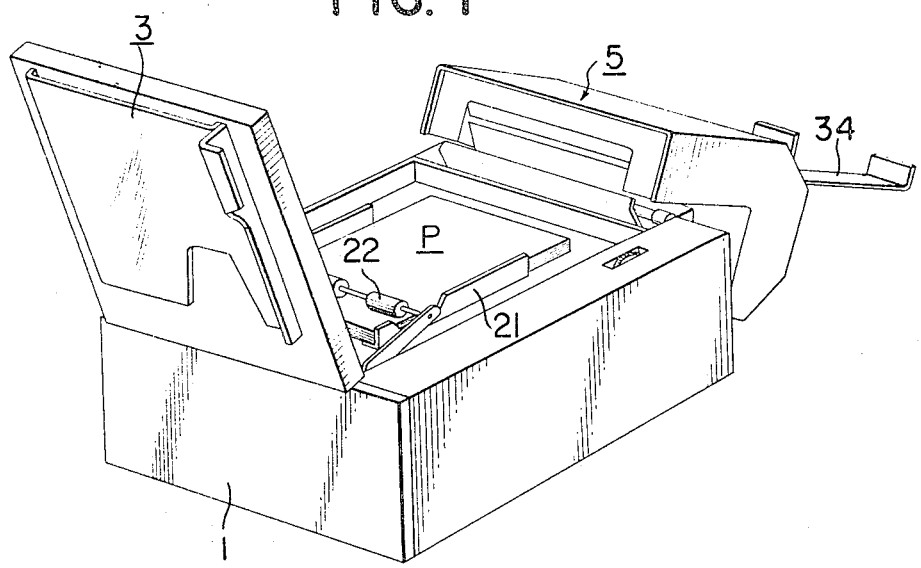
FIG. 1 is a perspective view of an electrophotographic copying apparatus according to an embodiment of the present invention.
Figure 2:
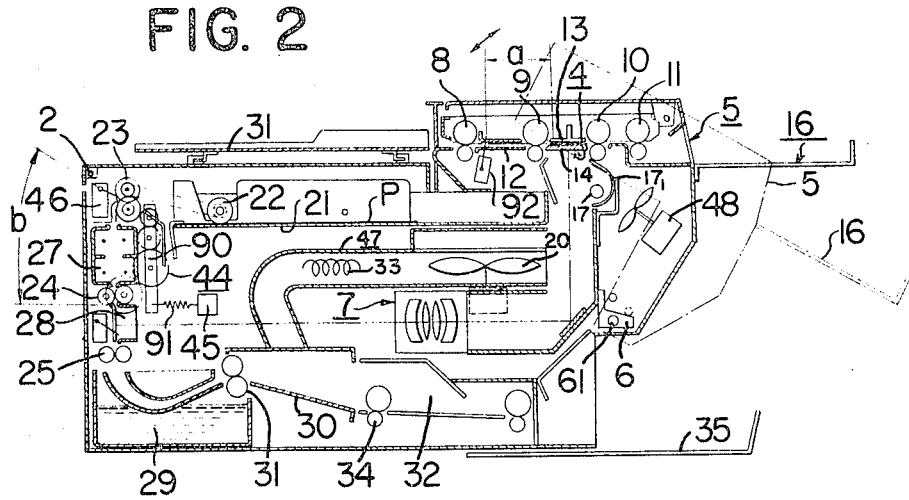
FIG. 2 is a longitudinal cross-sectional view of the same apparatus.

Referring to FIGS. 1 and 2, the electrophotographic copying apparatus embodying the present invention includes a machine housing 1, and an original feeding table 3 horizontally disposed in the housing 1 at the upper portion thereof. The original feeding table 3 is pivotally mounted on the housing 1 by means of a shaft 2. The copying apparatus further includes original transport means 5 detachably hinged at 6 to the housing 1 for pivotal movement about a shaft $6_1$. The original transport means is normally maintained in a horizontal plane common to the plane of the original feeding table 3. An original resting on the original feeding table 3 is fed therefrom along a guide member $3_1$ provided on one side of the original transport means 5 and transported horizontally by four sets of transport rollers 8–11 and guide plate 12 in the original transport means 5 so as to pass through an original illuminating station comprising a guide plate 13 and a glass sheet 14. Thereafter, the original is discharged along a guide plate 15 onto an original receiving tray 16.

When the original is passing through the illuminating station, the surface thereof carrying thereon an image to be copied is exposed to light from a light source 17 with a reflector 17 so that the image on the original is projected through an L-shaped optical system comprising a mirror 19 and a lens L onto a sheet of photosensitive paper P (hereinafter referred to as "paper sheet P") which is passing through an exposure station as will be described later. A blower 20 is provided at the entrance of a blast duct, and a photosensitive paper supply table 21 is disposed below the original feeding table 3. Paper sheets P piled on the photosensitive paper supply table 21 are one by one fed by a paper feed roller 22 and further guided downwardly by three pairs of paper transport rollers 23–25 and guide plate 26 into electrically charging means 27 and exposure means 28. Liquid-type developing means 29 is provided at the bottom of the housing 1 below the optical system so as to develop the paper sheet P transported thereinto by rollers 25 and guided along guide plate 30.

The paper sheet thus developed is squeezed by a pair of squeeze rollers 31 to remove the residual developer on the paper sheet, which is thereafter passed to drier means 32. The drier means 32, which is supplied with warm air sucked from the illuminating station by the blower 20 and heated by a heater 33 disposed within the duct, blows such warm air against the paper sheet discharged thereinto from the developing means 29 so as to dry the wet paper sheet and fix an image formed thereon. Thereafter, the paper sheet P is passed through discharge rollers 34 onto a copy tray 35.

Figure 4:
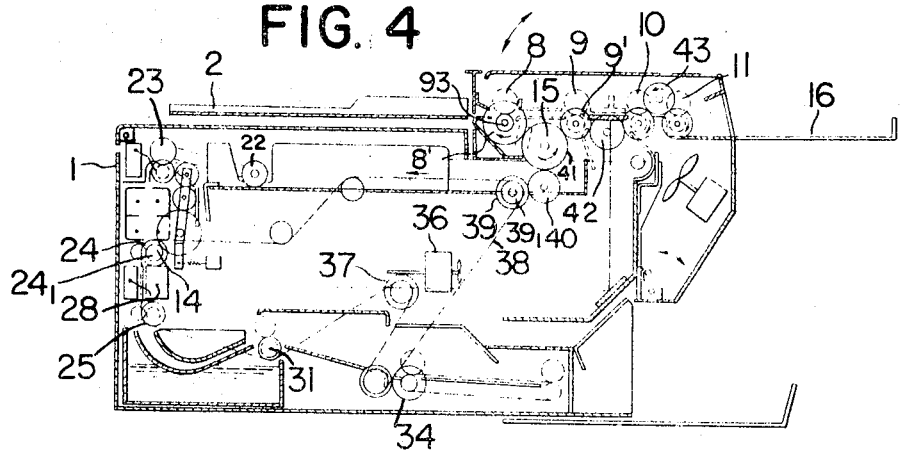
FIG. 4 is a schematic view showing the drive system in the apparatus of FIG. 1.
Figure 5:
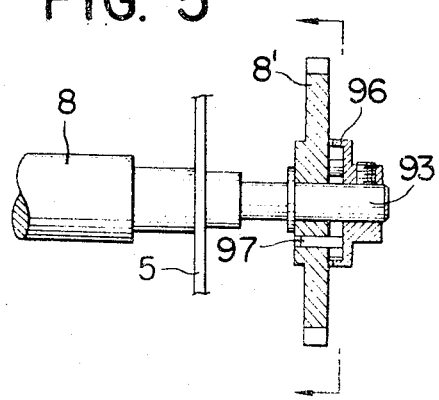
FIG. 5 is a fragmentary front view, partly in cross section, of the photosensitive paper transport roller having a one-way transmission clutch mechanism in the same apparatus.
Figure 6:
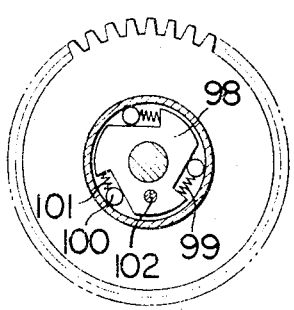
FIG. 6 is a sectional view taken along lines 6—6 of FIG. 5.

Drive mechanism for the photosensitive paper transport rollers 23–25 and drive mechanism for the original transport rollers 8–11 are operatively associated together so that the passage of the original through the original transport means 5 and the passage of the photosensitive paper through the electrically charging means and exposure means 27 and 28 are synchronized with each other. These drive mechanisms are integrated into a unitary drive system as shown in FIG. 4. A motor 36 is started by closing a power switch (not shown) to drive a gear 37, which in turn drives, via chain 38, two pairs of photosensitive paper transport rollers 24 and 25, a pair of squeeze rollers 31 and a pair of photosensitive paper discharge rollers 34. At the same time, four sets of original transport rollers 8–11 are also driven by the gear 37 via another transmission provided by chain 38, gear $39_1$ or roller 39 connected to chain 38, gear 40 connected to the gear $39_1$, and other intermediate gears 41–43 (FIGS. 5 and 6).

The photosensitive paper feed roller 22 normally remains stationary in spite of the rotation of the drive mechanism and is associated with that drive mechanism through a clutch so that it is intermittently driven by means of cam, microswitch and the like so as to feed paper sheets one by one at suitable time intervals. In the illustrated embodiment, a gear train 44 associated with the paper transport roller 24 is controlled by an electromagnet 45 to transmit the drive to the rollers 23, which thus rotate the paper feed roller 22. A microswitch 46 provided between the transport rollers 23 and the electrically charging means 27 is normally open to maintain the electromagnet inoperative, whereby the rollers 23 are operatively associated with the rollers 24 via gear train 44 to thereby cause the paper feed roller 22 to feed a paper sheet from the paper supply table 21. The paper sheet thus fed is passed by the transport rollers 23 to close the microswitch 46, whereby the electromagnet 45 is energized to attract the gear train 44 so that the gear train 44 is disengaged from the gear $24_1$ of the roller 24 to thereby disconnect the transmission between the rollers 23 and 24. As a result, the paper transport rollers 23 and feed roller 22 are stopped and accordingly the paper sheet P is stopped from moving.

Figure 3:
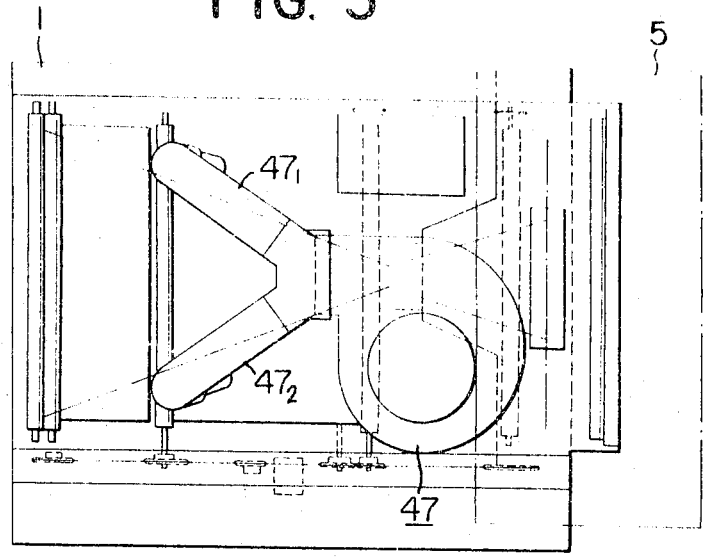
FIG. 3 is a horizontal cross-sectional view of the same apparatus.

A duct 47 for the drier means 32 is provided in the space between the underside of the paper supply table 21 and the L-shaped optical system. As shown in FIG. 3, the duct 47 has a bifurcated end portion forming two branch ducts $47_1$ and $47_2$ which extend outwardly of the opposite sides of the optical system so as to introduce warm air to the opposite sides of the drier means. Thus, the interior construction of the housing can be made compact without obstructing the light path of the optical system, and accordingly the entire apparatus can be made compact as well.

The blower 20 sucks the warm air around the light source 17 and over the optical system, and the sucked warm air is suitably heated by the heater 33 and blown against the developed photosensitive paper to dry the same and fix a formed image thereon. Therefore, even if the temperature rise of the air within the machine housing resulting from the heat energy emitted from the light source 17 is minimized or if the illuminating station is closely adjacent to the photosensitive paper supply station, no variation will be caused in the resistance characteristic of the photosensitive paper by temperature while the radiant heat energy from the light source may be utilized to dry the wet photosensitive paper to thereby economize the wattage of the heater 33. A cooling fan 48 is provided adjacent to the light source 17 to cool the same.

Another example of the photosensitive paper transport means will be described with reference to FIG. 4. Especially to make the electrophotographic copying apparatus compact in structure, this alternative example of the photosensitive paper transport means is arranged so that the distance of travel $a$ of the original to be copied and the distance of travel $b$ of the photosensitive paper are in the relation that $a > b$ or $a < b$ (FIG. 2) and that the arrival of the original at the illuminating station occurs concurrently with the arrival of the photosensitive paper at the exposure station. As seen in FIG. 4, an endless drive transmission chain 38 is disposed on a gear 37 secured to the housing 1 so as to transmit the drive of motor 36 via gear 37 to gears 39 and 24 carried on rollers 39' and $24_1$, respectively. A further gear 41 secured to the housing of the original transport means 5 is associated with the gear 39 via interconnecting gear 40. A first set of original transport rollers 8 carrying a gear 8' thereon and a second set of original transport rollers 9 carrying a gear 9' thereon are provided so that the gear 8' and 9' engage the gear 41. The second set of rollers 9 is followed by third and fourth sets of rollers 10 and 11. The third set of rollers 10 is connected with the second roller set 9 via an interconnecting gear $10_1$ and the fourth set of rollers 11 is connected with the third roller set 10 via an interconnecting gear 43. Thus, there is provided a unitary drive system for the photosensitive paper and the original.

In the described drive system, if the gear ratio between gears 8' and 9' is 2 : 1, the peripheral velocity of the first roller set 8 will be half that of the second roller set 9, so that the distance of travel $a$ of the original and the distance of travel $b$ of the photosensitive paper are in the relation that $a < b$. As shown in FIG. 2, the gear 24 is associated with a gear train 44 mounted on a rockable arm 90 so that a set of photosensitive paper transport rollers may be driven through gear train 44. The set of rollers 23 is rotated at a velocity double that of the first roller set 8 but equal to that of the second roller set 9. An electromagnet 45 disposed adjacent to the rockable arm 90 is controlled by microswitch 46 provided just behind the first roller set 8 and just before the electrically charging means 27. A plunger 91 is extended inwardly from the rockable arm 90 in opposed relationship with the electromagnet 45.

In operation, when an unshown power switch is closed the motor 36 starts to drive the chain 38, which in turn drives the photosensitive paper feed roller 22 via gear train 44 and rollers 23, whereby an uppermost paper sheet P is fed from the supply table 21. When the paper sheet P is about to reach the electrically charging means 27, the leading edge of the paper sheet actuates the microswitch 46 to energize the electromagnet 45, which thus attracts the plunger 91 and accordingly rocks the rockable arm 90 to thereby disconnect the transmission of the drive from the drive source to the rollers 23, whereby the paper sheet P is stopped before it enters the electrically charging means 27.

Subsequently, when an original to be copied is nipped between the first set of transport rollers 8, the leading edge of the original actuates the microswitch 92 to open the circuit of the electromagnet 45, which is thus deenergized to release the plunger 91 and return the rockable arm 90 to its initial position. Thus, the drive transmission is restored to drive the rollers 23 via gear train 44 so as to move the paper sheet P again.

The paper sheet P is moved by the rollers 23 whose peripheral velocity is double that of the first set of original transport rollers 8. In this way, the original and the paper sheet travel different distances at different velocities but they reach the original illuminating station 4 and the through-slit exposure means 28, respectively, at the same time. Thereafter, the original is transported into the illuminating station 4 through the second set of transport rollers 9 driven at the same velocity as the paper transport rollers 23, and further passed through the third and fourth sets of transport rollers 10 and 11 for discharge onto the original receiving tray 16. On the other hand, the paper sheet P now in the exposure means 28 is exposed to light through the optical system 7 so that the optical image of the original is formed on the exposed surface of the paper sheet P, which is thereafter passed to the developing means 29 and then to the fixing means 32, and finally discharged out of the copying apparatus.

In the above-described process, the velocity at which the original is moved by the first set of rollers 8 is lower than the velocity at which the paper sheet is transported, but after nipped between the second set of rollers 9 the original is transported at the same velocity as the paper sheet. Such change in the velocity of the original causes a greater tension in the original which might break or injure the material of the original. To eliminate such a possible inconvenience, a one-way transmission clutch mechanism as shown in FIGS. 5 and 6 is provided between the shaft 93 of the first roller set 8 and the gear 8' so that the first roller set 8 may be accommodated to the velocity of the second roller set 9.

In the operation of the one-way clutch mechanism as viewed in FIG. 6, rotation of the gear 8' drives the notched cam 98 by means of the interconnecting pin 102 which is received in the opening 97 in the gear 8'. Thus, when the gear 8' rotates clockwise, the rollers 100, which are urged outwardly by the springs 101, become wedged between the clutch 96 and the reduced areas of the notches in the cam 98, so that clockwise rotation is imparted to the shaft 93. However, when the advancing velocity of the original is increased, the roller 8 causes the shaft to drive the clutch 96, thereby overcoming the wedging action and permitting free wheeling rotation of the roller 8.

With the described alternative form of the drive system, the distance $a$ over which the original travels after it has actuated the microswitch 92 but before it enters the illuminating station 4 and the distance $b$ over which the paper sheet P is moved in response to a signal provided by that actuated microswitch 92 before it enters the exposure means 28 can be selected in the relation that $a > b$ or $a < b$ as described. Thus, the electrophotographic copying apparatus incorporating such drive system may be easier to design and this is very helpful to make the entire apparatus compact.

Also, if the peripheral velocity of the first set of original transport rollers 8 is lower than the other transport rollers as in the shown example, the original which may be curled or thin before fed is prevented from being wrinkled or otherwise deformed by the first transport rollers or from being nipped by these rollers obliquely thereto, whereby the original may be free of any undesirable injury. This is also very useful to achieve a high-speed copying operation.

Referring to FIGS. 7 and 8, there is shown an example of means for feeding paper sheets. Paper sheets P piled on the paper supply table 21 are fed in succession from the uppermost one to the lower by a paper feed roller 22 while being separated from the remaining paper sheets by a separator pawl 94, and a first separated paper sheet $P_1$ is guided along a guide 48 into the nip between paper transport rollers 23 and $23_1$. The paper sheet thus nipped is advanced until the leading edge thereof enters a passage 95 and actuates the lever $46_1$ of the microswitch 46 to stop a paper feed drive motor M. Thus, the paper sheet $P_1$ is stopped temporarily. When the motor M is again started by a subsequent start signal, the paper sheet $P_1$ is further advanced to a subsequent station such as electrically charging means or image transfer station.

After the trailing edge of the first paper sheet $P_1$ has passed the microswitch 46, a second paper sheet $P_2$ is advanced until its leading edge comes to the front of the microswitch 46 and waits for the next start signal.

In order to accomplish such intermittent feed of paper sheets, the feed of the second paper sheet $P_2$ occurs after the trailing edge of the first paper sheet $P_1$ has passed the feed roller 22. If the velocity of the first paper sheet $P_1$ as it passes through the transport rollers 23 and $23_1$ is equal to or higher than the velocity of the second paper sheet $P_2$ as it is fed by the feed roller 22, these two paper sheets $P_1$ and $P_2$ wil be moved while over-lapping each other over a length C as shown in FIG. 8. Therefore, the switch 46 can no longer detect the leading edge of the second paper sheet $P_2$ and this is also the case with all the succeeding paper sheets. Thus, feed of paper sheets would be continued until the paper sheet stock exhausts on the supply table 21.

To prevent this, the prior art arrangement has been such that the peripheral velocity of the feed roller 22 is lower than that of the transport rollers 23 and $23_1$ and by utilizing the velocity difference the second paper sheet $P_2$ is fed between the rollers 23 and $23_1$ only after the trailing edge of the first paper sheet $P_1$ has passed these rollers.

Such an arrangement, however, has entailed the requirement that the distance B be relatively great or the distance C be relatively small or that an extremely great difference be provided between the peripheral velocity of the roller 22 and that of the roller 23. However, when the separator pawl 94 is employed to ensure the separation of each paper sheet, the distances B and C must be so great that it is difficult to accomplish such a design as will satisfy the foregoing requirement. It is also undesirable in designing that an extremely great velocity difference is provided between the rollers 22 and 23.

Figure 10:
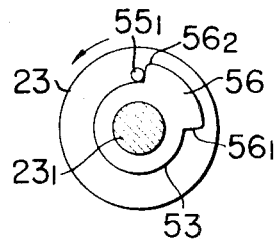
FIGS. 10 and 11 are front views of the idle mechanism in the paper feeding means.

In the example of the paper sheet feeding means now under discussion, an arm 50 is provided to interconnect the paper feed roller 22 and the paper transport roller 23, a sprocket $22_1$ is securely mounted on the shaft of the feed roller 22, and a sprocket 51 is loosely mounted on the shaft 23' of the transport roller 23, the sprocket $22_1$ having a greater diameter than the sprocket 51 so as to provide a great velocity difference. A chain 52 is entrained on the two sprockets $22_1$ and 51 to establish an operative association therebetween. The roller $23_1$ disposed adjacent to the transport roller 23 is driven by the motor M and adapted to be urged into contact with the roller 23. Loosely mounted on the shaft 23' of the transport roller 23 is a floating ring 53 in side-by-side relationship with the sprocket 51, and between the sprocket 51 and the ring 53 there is interposed a wind-up spring clutch 54 or other suitable one way transmission clutch. The transport roller 23 has a pin or other engaging member 55 at one end face thereof, and the floating ring 53 is formed with an engaging member 56 cooperating with the engaging member 55 on the transport roller 23, as shown in FIG. 10.

Figure 11:
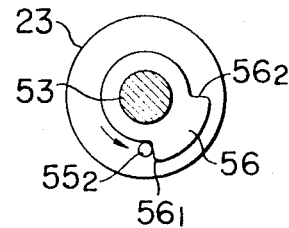
Figure 12:
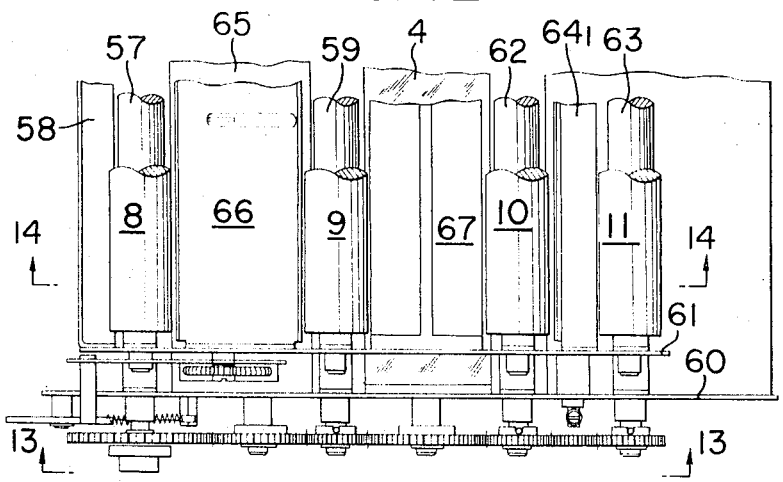
FIG. 12 is an enlarged plan view showing one half of the original transport means according to the present invention.

When the motor M is started by a start signal and the rollers $23_1$ and 23 are thereby driven to rotate, the following processes occur in succession;

1. The engaging member 55 of the transport roller 23 is displaced to the position of FIG. 11 and strikes and pushes the shoulder $56_1$ of the engaging member 56 of the floating ring 53.
2. Thus, the floating ring 53 is rotated together with the transport roller $23_1$ to thereby drive the sprocket 51 via wind-up spring 54.
3. The drive is transmitted from the sprocket 51 through the chain 52 and sprocket $22_1$ to the paper feed roller 22, which is thus rotated to feed an uppermost paper sheet $P_1$ from the supply table 21 with the aid of the separator pawl 94.
4. The paper sheet $P_1$ passes between the rollers 23 and $23_1$ and its leading edge actuates the actuator lever $46_1$ of the stop microswitch 46, which is thereby opened to stop the motor M and accordingly the paper sheet $P_1$ is stopped at its predetermined stop position.
5. By the next start signal the motor M is again started to advance the paper sheet $P_1$ from the stop position, whereupon the paper feed roller 22 is also driven to rotate.
6. At this point of time, however, the trailing edge of the paper sheet $P_1$ is still engaged by the feed roller 22, so that the rotation of the rollers 23 and $23_1$ is transmitted through the drawn paper sheet $P_1$ to the feed roller 22, which is thus rotated at the same velocity as rollers 23 and $23_1$, whereby the smaller-diametered sprocket 51 is now driven by the greater-diametered sprocket $22_1$ through the chain 52.
7. Because of the diameter difference between the two sprockets $22_1$ and 51, the smaller sprocket 51 is rotated faster than the sprocket $22_1$ and accordingly the engaging member 56 is rotated faster than the engaging member 55 of the transport roller 23, whereby the engaging member 56 pushes the engaging member 55 into the position of FIG. 10 at least until the trailing edge of the paper sheet $P_1$ leaves the feed roller 22.
8. Since engaging member 55 is integral with the transport roller 23, the floating ring 53 does not follow the movement of the sprocket 51 and the wind-up spring 54 is loosened, so that the floating ring 53 is caused to slip.
9. The paper feed roller 22 is being driven by the paper sheet $P_1$ moved by the transport roller 23, as described above, and therefore, when the trailing edge of the paper sheet $P_1$ leaves the feed roller 22, the sprocket $22_1$ stops its rotation to thereby stop the first paper feeding operation and the engaging member 56, while the transport roller 23 and engaging member 55 thereon continue to rotate.
10. When the transport roller makes substantially one rotation, the engaging member 55 again actuates the engaging member 56 to thereby resume the paper feed to feed a second paper sheet $P_2$.

11. The first paper sheet $P_1$ is still advancing and its trailing edge passes between the rollers 23 and $23_1$, whereafter the leading edge of the second paper sheet $P_2$ is in turn nipped between the rollers 23 and $23_1$. After the trailing edge of the first paper sheet $P_1$ has passed the stop switch 46, the leading edge of the second paper sheet $P_2$ actuates that switch to stop the motor M and the second paper feeding operation.

In the stages mentioned under items 6) and 7) above, when the sprocket 51 is rotated faster than the roller 23, the wind-up spring 54 is loosened and the force acting on the floating ring 53 becomes too small to drive that ring. Therefore, the force of the spring 54 may be set so as to enable the floating ring 53 to be driven thereby.

According to the present invention, when the first paper sheet $P_1$ is advanced until its trailing edge leaves the paper feed roller 22, this roller temporarily stops its rotation until the first paper sheet $P_1$ completely passes through the transport rollers 23 and $23_1$, and immediately after such passage of the paper sheet $P_1$ the leading edge of the second paper sheet $P_2$ reaches the transport rollers 23 and $23_1$. Therefore, no possibility arises that the first and second paper sheets $P_1$ and $P_2$ overlap each other to cause continuous feed of these paper sheets. Moreover, a cycle of operation from the paper feed through the temporary stoppage till the resumption of the paper feed is accomplished automatically by a simple mechanism, and thus malfunctioning can be minimized and highly reliable performance is ensured.

Referring to FIGS. 12 to 17, there is shown another example of the original transport means for the electrophotographic copying apparatus according to the present invention. This alternative embodiment is intended to ensure any thin or thick original to be transported at a uniform velocity without jamming in the course of transport, to prevent the original from being injured or jamming as a result of excessively great contact pressure between the original and the transport means, and ensure timing between the feed of the original and that of a paper sheet if the copying apparatus is of the type in which a signal for feeding a paper sheet is detected by utilizing a predetermined velocity of the original passing through the original transport means.

In FIGS. 12 to 17, there are seen groups of originals transport rollers disposed before and behind the original illuminating station. Lower rollers 57, 59, 62 and 63 of these roller groups are journaled to the machine housing 1 or to opposite bearing plates 60 integral with the machine housing (only one of such bearing plates being shown in FIG. 12). Upper rollers 8, 9, 10 and 11 are journalled to opposite bearing plates 61 integral with upper guides 58, 66, 67 and $64_1$ so as to form and upper roller group supporting unit which is separate from the machine housing 1. Such upper roller group supporting unit is detachably mounted for vertical movement and slight pivotal movement with respect to the housing 1, and at least the two endmost rollers 8 and 11 are mounted for vertical movement with respect to the bearing plates 61. Thus, the upper and lower rollers forming each set are brought into contact with each other when the original is fed therebetween.

In the shown example, the vertical movement of the above-described upper roller group supporting unit may be accomplished by springs $72_1$ and $72_2$ secured to spring securing means 70 provided at the opposite ends of the fixed bearing plates 60 and to spring securing means 71 provided in the bearing plates 61 of the upper roller group supporting unit, respectively. These springs $72_1$ and $72_2$ bias the upper roller group supporting unit downwardly so as to bring the upper rollers 9 and 10 into contact with the corresponding lower rollers 59 and 62. At the same time, the other upper rollers 8 and 11 are lowered by their own gravity into contact with the corresponding lower rollers 57 and 63.

When a thick original G, having been set in position, is fed toward guides 58 and $58_1$ in the direction indicated by arrow in FIG. 16-1, the guide 58 is raised by the original to a degree corresponding to the thickness thereof against the force of spring $72_1$. This causes the roller bearing plates 61 to pivot about the point of contact between the rollers 62 and 10. Further, the original G is to be manually forced between the rollers 57 and 8 as shown in FIG. 16-1, whereas the roller 8 is lowered by its own gravity into contact with the roller 57 because the roller 8 is movable vertically with respect to the bearing plates 61, which are already displaced clockwise. Therefore, at the moment when the original G begins to be nipped between the rollers 57 and 8, the roller 8 is lightly raised to contact the bearing plates 61, and at a further moment when the original is completely nipped between these rollers 57 and 8, the roller 8 is raised to a degree corresponding to the thickness of the original and the forward portions of the bearing plates are now raised by the roller 8. It will thus be noted that the contact pressure between the rollers 57 and 8 is very low at the moment when the original is nipped therebetween and once nipped, the original is transported without slipping with the aid of the force of spring $72_1$, whereby no forcible pressure may occur in the original as it is nipped and the original may be free of injury or deformation.

Figure 13:
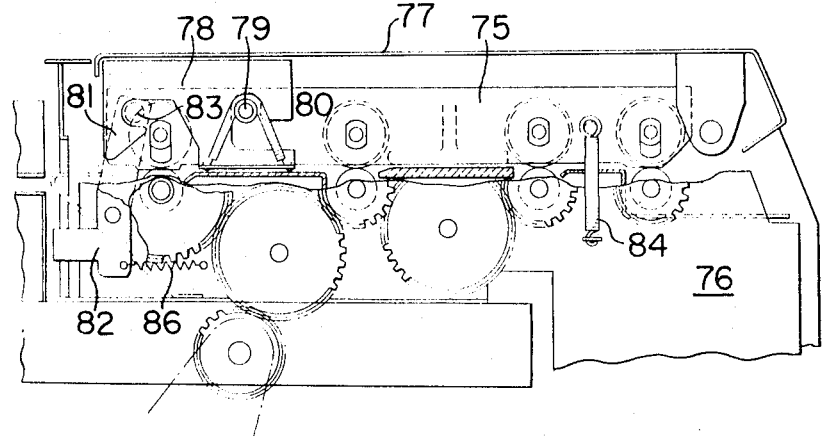
FIG. 13 is a view taken along lines 13—13 of FIG. 12.
Figure 14:
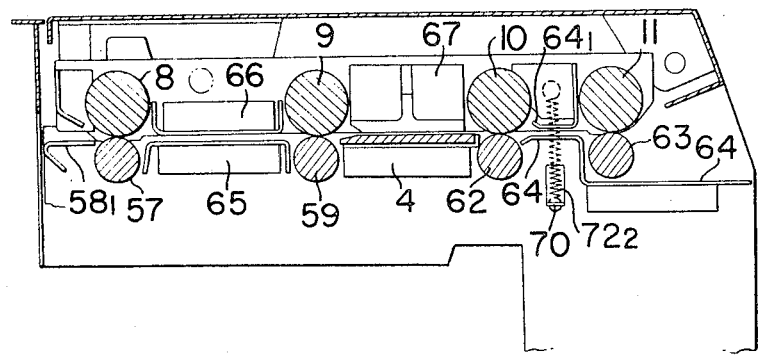
FIG. 14 is a view taken along lines 14—14 of FIG. 12.

The original G is further transported to guides 65 and 66 by rollers 57 and 8 as shown in FIG. 16–2. Since the bearing plates 61 are already raised as described, the guide 66 fixed thereto is also raised and thus a greater spacing is provided between the guide 66 and the guide 65. In the position of FIG. 13 where no original is fed as yet, the rollers 57 and 8 are in contact with each other and the guides 65 and 66 are suitably spaced apart, and once the original is nipped between the rollers 57 and 8, the guides 65 and 66 are spaced apart a greater distance than before. Such a greater spacing between the guides 65 and 66 ensures smooth passage of the original therebetween without jamming or friction relative to the guides which may result in the irregular velocity of movement of the original. The leading edge of the original as it passes the vicinity of the guides 65 and 66 is detected as by microswitch 92 (FIG. 1) and, in accordance with the detection signal, the feed of a paper sheet is started so that it is subjected to the exposure process exactly in synchronism with the movement of the original without any timing error. Thereafter, the leading edge of the original reaches the rollers 59 and 9, which are then ready to nip the original therebetween as shown in FIG. 16-2 because the roller 9 is raised by the forward portion of each bearing plate 61 which has been raised since the original was nipped between the preceding rollers 57 and 8. Thus, the original is allowed to be smoothly nipped between the rollers 59 and 9.

The original is to be further transported to the illuminating station. When the leading edge of the original is nipped between the rollers 59 and 9, the roller bearing plates 61 are urged to swing clockwise about the point of contact between the rollers 59 and 9 by the springs $72_1$ in the forward portions of the bearing plates 61, so that a spacing corresponding to the thickness of the original is provided between the rollers 10 and 62. In other words, the forces of the springs $72_1$ and $72_2$ provided at the opposite ends of the bearing plates 61 are so preset that the upper roller group supporting unit becomes parallel to the lower roller group supporting unit at that time, as shown in FIG. 16–4.

Thus, the spacing between the guide 67 and the glass sheet 4 is made slightly greater than the thickness of the original so as to allow the original to pass smoothly through the illuminating station at a constant velocity without jamming or making frictional contact with the guide 67, whereby proper exposure process is ensured.

If the rollers 62 and 10 of the subsequent set are in contact with each other when the leading edge of the original reaches these rollers, as is the case with the copying apparatus of the prior art, then a time delay will be unavoidably caused before the original is nipped between the rollers. According to the present invention, the rollers 62 and 10 are spaced apart a distance substantially corresponding to the thickness of the original as described already, so that such time delay can be minimized at this point of time to enable proper passage of the original through the illuminating station. During that time, the roller 11 is lowered by its own gravity to contact the roller 63 to thereby shield the illuminating station from any extraneous light. Also, even if the trailing edge of the original completely leaves the rollers 57 and 8 while the original is passing through the illuminating station, it will in no way affect the transportation of the original because the upper roller group supporting unit as a whole makes no movement except the roller 8 which is lowered by its own gravity to contact the roller 57. When the leading edge of the original further reaches the rollers 63 and 11, the roller 11 is raised by that leading edge to a degree corresponding to the thickness of the original and assumes a position as shown in FIG. 16–5. Guides 64 and $64_1$ interposed between the sets of rollers 62, 10 and 63, 11 are spaced apart a sufficient distance to allow the smooth passage of the original therebetween. When the original is further transported by the rollers 63 and 11 and its trailing edge completely leaves the rollers 59 and 9 as shown in FIG. 16–6, the upper roller group supporting unit is swung counter-clockwise about the point of contact between the rollers 57 and 8 by the spring $72_1$, whereby the original continues to be transported smoothly.

As has been noted above, any original having a great or small thickness can be transported smoothly at a uniform velocity so that clear copies can be obtained. Even if the original should be jammed somewhere in the course of transport, the original may be readily removed by dismounting or raising the detachable upper roller group supporting unit. This is accomplished by the arrangement described hereunder.

Figure 15:
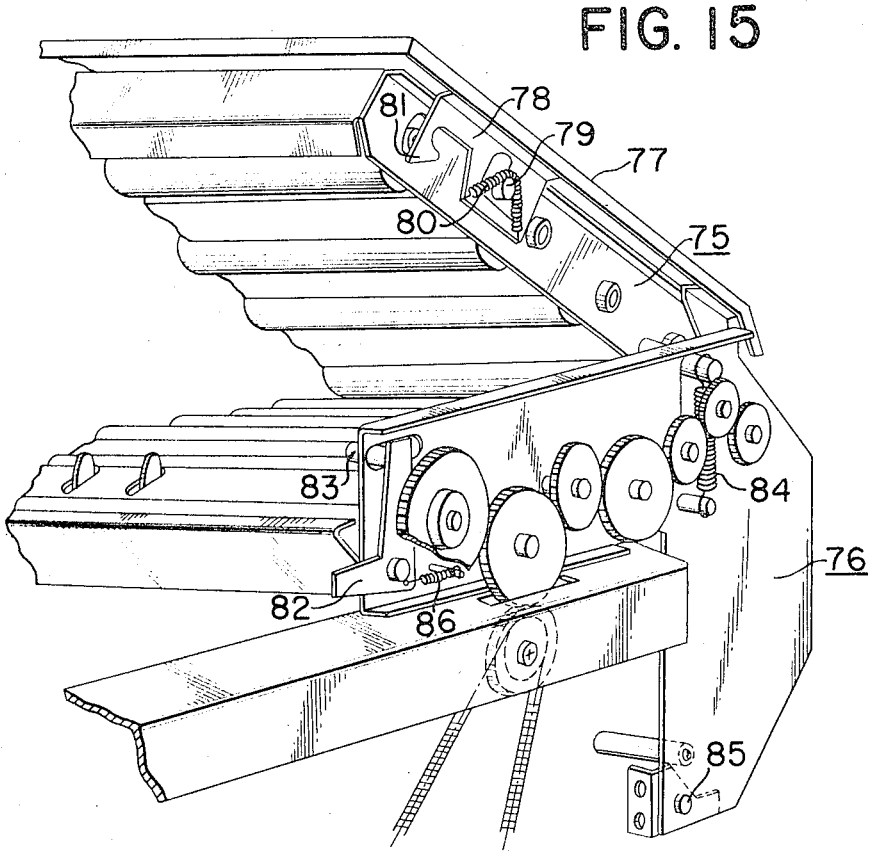
FIG. 15 is a perspective view showing the original transport means of FIG. 12 with the upper roller group supporting unit for the original transport means being opened.

In FIG. 15, the upper roller group supporting unit 75 is mounted for pivotal movement about a shaft 85 provided on the side plate 76 of that unit. An upper lid 77 has dependent plates 78 secured thereto, and a dowel 79 is secured to each dependent plate 78 by means of spring 80. Thus, the upper roller group supporting unit can be raised by raising or opening the upper lid 77.

When the upper roller group supporting unit is in closed position, a hook 81 extending downwardly from the upper lid 77 engages a dowel 83 provided at the upper end of a lever arm 82, whereby springs 80 and 84 are compressed to maintain the lid 77 closed.

When it is desired to open the upper lid 77, the lever arm 82, which is normally biased in one direction by a spring 86, may be gripped and raised to release the engagement between the dowel 83 of the lever 82 and the hook 81 of the upper lid 77.

According to the above-described embodiment, the original transport rollers and guides are divided into upper and lower groups with the path of original interposed therebetween, and this provides a ready access to the interior of the original transport means so as to eliminate jamming of the original in its path or clean the illuminating station, especially the glass sheet in that station.

What is claimed is:

1. An electrophotographic copying apparatus comprising a housing having an exposure station and an original illuminating station, original feeding means for transporting an original through the original illuminating station, paper sheet supply means, means for generating a paper sheet supply signal, a paper feed drive motor energized by said signal, a transmission system driven by said motor, a paper feed roller and paper transport rollers driven by said transmission system to deliver paper sheets successively from said supply means to the exposure station, means connected to said motor and including a switch actuated by the leading edge of each paper sheet at a predetermined position for successively stopping the paper sheets at a position disposed between the paper sheet supply means and the exposure station until generation of a said supply signal, wherein said switch is disposed between one of said transport rollers and said exposure station, said transmission system including transmission mechanism means for temporarily stopping movement of said paper feed roller upon movement of a trailing edge of each paper sheet past said feed roller and for resuming movement of said feed roller during a period of continuous movement of said transport rollers thereby providing a space between succeeding sheets of paper, and L-shaped optical system means for optically connecting said original illuminating station to an exposure station so that each of said paper sheets is exposed to light carrying the image of said original.

2. An apparatus according to claim 1, wherein said transmission mechanism means for temporarily stopping said paper feed roller includes floating ring means having a first engaging member and being rotatably mounted on one of said paper transport rollers, a second engaging member fixed to said one transport roller, a first sprocket, wind-up spring clutch means connected between said first sprocket and said floating ring means, a second sprocket fixed to said paper feed roller, a chain interconnecting said first and second sprockets, whereby when the trailing edge of each paper sheet leaves said paper feed roller, said second sprocket and said first engaging member of said floating ring means are temporarily stopped while said paper transport roller and said second engaging member continue to rotate so that a preceding paper sheet is separated from a succeeding paper sheet.

* * * * *